United States Patent
Matsui et al.

(10) Patent No.: US 10,718,961 B2
(45) Date of Patent: Jul. 21, 2020

(54) SPECTACLE LENS

(71) Applicant: HOYA LENS THAILAND LTD., Thanyaburi, Patumthani (TH)

(72) Inventors: Yoshitaka Matsui, Tokyo (JP); Yoichi Ogo, Tokyo (JP); Koushi Harada, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/038,829

(22) PCT Filed: Nov. 26, 2014

(86) PCT No.: PCT/JP2014/081267
§ 371 (c)(1),
(2) Date: May 24, 2016

(87) PCT Pub. No.: WO2015/080160
PCT Pub. Date: Jun. 4, 2015

(65) Prior Publication Data
US 2017/0075144 A1   Mar. 16, 2017

(30) Foreign Application Priority Data
Nov. 26, 2013   (JP) .................................. 2013-244307

(51) Int. Cl.
*G02C 7/10* (2006.01)
*G02B 5/28* (2006.01)

(52) U.S. Cl.
CPC ............. *G02C 7/107* (2013.01); *G02B 5/282* (2013.01); *G02C 7/104* (2013.01); *G02C 2202/16* (2013.01)

(58) Field of Classification Search
CPC ... G02C 7/10; G02C 7/12; G02C 7/02; G02C 7/107; G02C 7/104; G02C 2202/16; G02B 5/282
(Continued)

(56) References Cited

U.S. PATENT DOCUMENTS 4,793,669 A * 12/1988 Perilloux ............... G02B 5/282
                                                      359/355
4,896,928 A *  1/1990 Perilloux ............... G02B 5/285
                                                      359/359

(Continued)

FOREIGN PATENT DOCUMENTS

CN    101243022 A    8/2008
CN    101288007 A   10/2008
(Continued)

OTHER PUBLICATIONS

May 30, 2017 Office Action issued in Japanese Patent Application No. 2015-550967.
(Continued)

*Primary Examiner* — Travis S Fissel
(74) *Attorney, Agent, or Firm* — Oliff PLC

(57) ABSTRACT

An aspect of the present invention relates to a spectacle lens including a multilayer film of a vapor deposition film (excluding a metal film and a metal alloy film) directly or indirectly at least on one surface of a lens substrate. The multilayer film includes at least one high refractive index layer and at least one low refractive index layer, the total optical film thickness of the high refractive index layer is $\lambda/4$ or more at a wavelength $\lambda=780$ nm, and a reflection spectrum measured in a wavelength range of 380 to 2000 nm on a surface having the multilayer film has a maximum reflectance in a wavelength range of 800 to 1350 nm.

8 Claims, 1 Drawing Sheet

(58) Field of Classification Search
USPC ......... 351/159.6–159.81; 359/355, 356, 359, 359/360, 361
See application file for complete search history.

(56) References Cited

U.S. PATENT DOCUMENTS

| | | | |
|---|---|---|---|
| 5,694,240 A | | 12/1997 | Sternbergh |
| 6,565,982 B1* | | 5/2003 | Ouderkirk ......... B32B 17/10018 359/584 |
| 7,456,384 B2 | | 11/2008 | Toda |
| 2002/0071075 A1* | | 6/2002 | Ogino ............... G02F 1/133553 349/113 |
| 2004/0240093 A1* | | 12/2004 | Yoshikawa ......... C23C 14/0635 359/883 |
| 2007/0177280 A1* | | 8/2007 | Hirayama ............. G02B 5/282 359/722 |
| 2007/0178315 A1 | | 8/2007 | Thomas et al. |
| 2008/0199670 A1* | | 8/2008 | Yaoita ............... B32B 17/10036 428/213 |
| 2009/0168184 A1* | | 7/2009 | Yamada ................. G02B 1/115 359/601 |
| 2009/0237782 A1 | | 9/2009 | Takamatsu et al. |
| 2010/0103523 A1* | | 4/2010 | Fukui .................... G02B 1/115 359/581 |
| 2010/0132756 A1 | | 6/2010 | Tonooka et al. |
| 2011/0170037 A1* | | 7/2011 | Nirmal .............. G02F 1/133603 349/68 |
| 2011/0229660 A1* | | 9/2011 | Reynolds ................ C23C 14/08 427/595 |
| 2011/0249332 A1* | | 10/2011 | Merrill ................. G02B 5/0841 359/485.01 |
| 2012/0026580 A1 | | 2/2012 | Kiyoto |
| 2013/0258278 A1 | | 10/2013 | Rigato et al. |

FOREIGN PATENT DOCUMENTS

| | | |
|---|---|---|
| JP | S60-059220 U | 4/1985 |
| JP | H5-032828 U | 4/1993 |
| JP | H05-32828 Y2 | 8/1993 |
| JP | H07-92301 A | 4/1995 |
| JP | H10-186291 A | 7/1998 |
| JP | 2001-281409 A | 10/2001 |
| JP | 2004-325511 A | 11/2004 |
| JP | 2007-148330 A | 6/2007 |
| JP | 2010-511205 A | 4/2010 |
| JP | 2012-032454 A | 2/2012 |
| JP | 5057485 B2 | 10/2012 |
| JP | 2013-011711 A | 1/2013 |
| JP | 2013-097160 A | 5/2013 |
| JP | 3183633 U | 5/2013 |
| JP | 2014-203063 A | 10/2014 |
| KR | 2010-0014582 A | 2/2010 |
| WO | 2013/168565 A1 | 11/2013 |

OTHER PUBLICATIONS

Jun. 1, 2017 Search Report issued in European Patent Application No. 14865504.6.
H.A. MacLeod. "Antireflection Coatings". Thin-Film Optical Filters, IOP, Bristol, GB, Jan. 1, 2001, pp. 86-157.
Jan. 20, 2015 International Search Report issued in International Patent Application No. PCT/JP2014/081267.
Jun. 9, 2016 International Preliminary Report on Patentability issued in International Patent Application No. PCT/JP2014/081267.
Sep. 6, 2016 Office Action issued in Australian Patent Application No. 2014355397.
Aug. 30, 2017 Office Action issued in Korean Patent Application No. 10-2016-7016984.
Mar. 15, 2018 Notice of Final Rejection issued in Korean Patent Application No. 10-2016-7016984.
Mar. 22, 2018 Official Communication issued in European Patent Application No. 14 865 504.6.
May 15, 2018 Office Action issued in Korean Patent Application No. 10-2016-7016984.
May 4, 2018 Office Action issued in Chinese Patent Application No. 201480064648.3.
Dec. 26, 2017 Office Action issued in Japanese Patent Application No. 2015-550967.
Dec. 25, 2018 Office Action issued in Chinese Patent Application No. 201480064648.3.
Nov. 22, 2018 Office Action issued in European Patent Application No. 14 865 504.6.
May 14, 2019 Trial and Appeal Decision issued in Japanese Patent Application No. 2015-550967.
Jul. 5, 2019 Office Action issued in Chinese Patent Application No. 201480064648.3.
Sep. 30, 2019 Office Action issued in Korean Patent Application No. 10-2018-7023503.
Mar. 20, 2020 Office Action issued in European Patent Application No. 14865504.6.
Apr. 14, 2020 Office Action Issued in Korean Patent Application No. 10-2018-7023503.
Written Submission by Third Party in Korean Patent Application No. 10-2018-7023503, dated May 4, 2020.

* cited by examiner

SPECTACLE LENS

CROSS REFERENCE OF RELATED APPLICATION

The present application claims priority based on Japanese patent application No. 2013-244307 filed on Nov. 26, 2013, and the entire description thereof is incorporated here particularly as disclosure.

TECHNICAL FIELD

The present invention relates to a spectacle lens, and specifically to a spectacle lens capable of reducing burden of the eye of a spectacle wearer.

BACKGROUND ART

In general, various abilities are imparted to a spectacle lens by realizing a desired refractive index due to a lens substrate and forming various functional films on the lens substrate. In order to obtain a desired ability, the lens substrate may contain an additive. As the lens substrate for spectacles, a plastic lens substrate and a glass substrate are used. However, in recent years, the plastic lens substrate has been widely used due to advantages that the plastic lens substrate is light, is not cracked easily, and an additive is added thereto easily.

One of abilities desired for a spectacle lens is to reduce burden of the eye due to incident light. Light incident on the eye in daily life contains light of various wavelengths. JP 7-92301 A and JP 2013-11711 A (entire description thereof is incorporated here particularly as disclosure) have proposed imparting an ability (reduction in infrared ray) to reflect or absorb an infrared ray to a spectacle lens in order to reduce the amount of an infrared ray contained in sunlight incident on the eye.

SUMMARY OF INVENTION

JP 7-92301 A has proposed regulating transmission of an infrared ray by adding a dye to a coating film provided on a lens or a lens surface. However, addition of a dye causes coloring of a lens inevitably, and therefore is not desirable as an infrared ray reduction means in a spectacle lens, requiring an extremely high transmittance (more specifically, luminous transmittance).

Meanwhile, JP 2013-11711 A has proposed cutting light in a wide wavelength range of 780 to 2500 nm by providing a multilayer inorganic vapor deposition film containing a metal or metal alloy film (hereinafter, referred to as "metallic thin film") on a lens substrate. However, the means using a metal thin film causes coloring of a lens due to metal, and therefore leads to deterioration of a luminous transmittance. It is not desirable to apply the means using a metallic thin film to a spectacle lens.

As described above, in the method described in JP 7-92301 A or JP 2013-11711 A, it is difficult to obtain both a high luminous transmittance and reduction in infrared ray required for a spectacle lens.

An aspect of the present invention provides a spectacle lens capable of exhibiting a high luminous transmittance and reducing burden of the eye due to an infrared ray contained in sunlight.

The present inventors made intensive studies, and as a result, have conceived of the following novel technical idea.

A conventional infrared ray reduction means targets a wide wavelength range. For example, JP 2013-11711 A targets a wavelength range of 750 to 2500 nm. In addition to JP 2013-11711 A, JP 2012-208282 A (the entire description thereof is incorporated here particularly as disclosure) targets a wide wavelength range of 750 to 1800 nm.

Meanwhile, the present inventors focused on a fact that an infrared ray contained in sunlight is not emitted uniformly at a high intensity over a wide wavelength range, but a large peak is present in a relatively short wavelength range in an infrared region, and the intensity is reduced monotonously in a longer wavelength range than the peak wavelength. Therefore, it can be said that it is not necessarily necessary to target light in a wide infrared region in order to reduce burden of the eye due to sunlight effectively. This point has not been considered at all in a conventional infrared ray reduction means in a spectacle lens, but has been newly focused on by the present inventors.

The present inventors made further intensive studies focusing on the above point. As a result, the present inventors have newly found the following spectacle lens according to the aspect of the present invention, including a multilayer film of a vapor deposition film (excluding a metal film and a metal alloy film) directly or indirectly at least on one surface of a lens substrate, in which the multilayer film includes at least one high refractive index layer and at least one low refractive index layer, the total optical film thickness of the high refractive index layer is $\lambda/4$ or more at a wavelength $\lambda=780$ nm, and a reflection spectrum measured in a wavelength range of 380 to 2000 nm on a surface having the multilayer film has a maximum reflectance in a wavelength range of 800 to 1350 nm. A reason why the metal film and the metal alloy film are excluded from the vapor deposition film constituting the multilayer film is that a multilayer film including these metallic thin films causes coloring of a lens to deteriorate a luminous transmittance. Here, the metal film means a vapor deposition film formed by using a metal simple substance as a vapor deposition material, and the metal alloy film means a vapor deposition film formed by using a metal alloy as a vapor deposition material. As described above, the maximum reflectance means a maximum reflectance in a reflection spectrum measured in a wavelength range of 380 to 2000 nm. The aspect of the present invention has been completed based on a technical idea different from a conventional infrared ray reduction means, that is, based on an idea that a multilayer vapor deposition film is designed so as to have a maximum reflectance in a wavelength range of 800 to 1350 nm in which light with a high intensity is emitted of solar infrared rays while the total optical film thickness of the high refractive index layer is $\lambda/4$ or more ($\lambda=780$ nm) in order to obtain an infrared ray reflectivity in the wavelength range from a visible ray to a near-infrared region.

According to the aspect, the lens substrate is a plastic lens substrate.

According to the aspect, in the multilayer film, the total layer number of the high refractive index layer and the low refractive index layer is nine or less. JP 2012-208282 A above describes that the lamination number is from 10 to 150 because a wavelength range in which reflection can be performed can be widened with increase in the lamination number of a multilayer film. Meanwhile, the smaller total lamination number than the lamination number described in JP 2012-208282 A (the total lamination number of a high refractive index layer and a low refractive index layer in a multilayer film formed by vapor deposition is nine or less) is preferable in term of capability of reducing time of exposure of a lens substrate to a high temperature during vapor deposition. In an aspect in which the lens substrate is a plastic lens substrate easily deformed (furthermore, cracked due to deformation) or melted due to a high temperature, the small lamination number of multilayer film formed by vapor deposition is preferable. By making the total optical film thickness of a high refractive index layer included in the multilayer film $\lambda/4$ or more at a wavelength $\lambda=780$ nm, it is possible to reduce burden of the eye due to an infrared ray contained in sunlight even when the lamination number is as low as nine or less.

That is, a preferable aspect of the present invention relates to a spectacle lens including a multilayer film of a vapor deposition film (excluding a metal film and a metal alloy film) directly or indirectly at least on one surface of a plastic lens substrate, in which the multilayer film includes at least one high refractive index layer and at least one low refractive index layer, the total layer number of the high refractive index layer and the low refractive index layer is nine or less, and the total optical film thickness of the high refractive index layer is $\lambda/4$ or more at a wavelength $\lambda=780$ nm, and a reflection spectrum measured in a wavelength range of 380 to 2000 nm on a surface having the multilayer film has a maximum reflectance in a wavelength range of 800 to 1350 nm.

According to the aspect, the reduction ratio in solar infrared spectrum in the spectacle lens is 25% or more. Here, the reduction ratio in solar infrared spectrum is calculated by the following formula using a mean spectral transmittance weighted by a solar spectral intensity on the sea surface for air mass 2 (AM2) (transmittance in solar infrared spectrum defined in JIS T 7330, hereinafter referred to as "transmittance in solar infrared spectrum") at a wavelength of 780 to 2000 nm.

Reduction ratio in solar infrared spectrum (%)=100−
(transmittance in solar infrared spectrum)=100−
$\int d\lambda[I(\lambda) \times T(\lambda)]/\int d\lambda I(\lambda)$ (Above, $\lambda$ means a range of 780 to 2000 nm, $I(\lambda)$ means a sunlight spectrum, and $T(\lambda)$ means a transmittance spectrum of a spectacle lens.)

According to the aspect, the reflectance on the surface having the multilayer film is 30% or less at a wavelength 1800 nm.

According to the aspect, the mean reflectance on the surface having the multilayer film is less than 10% in a wavelength range of 600 to 780 nm. A spectacle lens having a multilayer film including a metallic thin film tends to be colored by increase in reflectance in the above wavelength range. However, the multilayer film included in the spectacle lens according to the aspect of the present invention does not include a metallic thin film. This can realize a low reflectance in the above wavelength range.

According to the aspect, the mean transmittance of the spectacle lens is 75% or more in a wavelength range of 600 to 780 nm.

According to the aspect, the luminous transmittance of the spectacle lens is 80% or more. The luminous transmittance is defined in JIS T 7330. As described above, the spectacle lens according to the aspect of the present invention does not include a metallic thin film to cause coloring of a lens in a multilayer film, and therefore can exhibit such a high luminous transmittance as 80% or more.

According to the aspect, the above spectacle lens has a main wavelength in a range of 400 to 500 nm. The main wavelength is defined in JIS Z 8105. A spectacle lens having a main wavelength in a range of 400 to 500 nm can reduce the amount of short-wavelength light, so-called blue light, incident on the eye. This point will be further described. A monitor screen of a recent digital device has been changed from a cathode-ray tube to a liquid crystal, and an LED liquid crystal has also become popular recently. However, the liquid crystal monitor, particularly an LED liquid crystal monitor strongly emits short-wavelength light, so-called blue light, having a wavelength of about 420 nm to 450 nm close to the wavelength of an ultraviolet ray. Therefore, in order to effectively reduce asthenopia or a pain of the eye caused by long time use of a personal computer or the like, measures to blue light should be taken. In the spectacle lens according to the aspect of the present invention, by an optical design of a multilayer film, more specifically by adjusting a film thickness of each layer of the multilayer film, the main wavelength can be controlled to a range of 400 to 500 nm. As the lamination number of a multilayer film is larger, an accuracy when a desired spectral characteristic is obtained by adjusting a film thickness of each layer of the multilayer film tends to be lower. However, the lamination number of the multilayer film in the spectacle lens according to the preferable aspect of the present invention is nine or less, and therefore a desired spectral characteristic can be realized easily by adjusting a film thickness of each layer.

According to the aspect, the spectacle lens includes the multilayer film directly or indirectly on both surfaces of a lens substrate.

According to the aspect, the high refractive index layer is a vapor deposition film made of a high refractive index material having a refractive index of 2.0 or more and less than 2.4 at a wavelength 780 nm.

According to the aspect, the low refractive index layer is a vapor deposition film made of a low refractive index material having a refractive index of 1.2 or more and 1.8 or less at a wavelength 780 nm.

Advantageous Effects of Invention

The present invention can provide a spectacle lens exhibiting a high luminous transmittance and capable of effectively reducing burden of the eye due to sunlight.

DESCRIPTION OF EMBODIMENTS

A spectacle lens according to an aspect of the present invention relates to a spectacle lens including a multilayer film of a vapor deposition film (excluding a metal film and a metal alloy film) directly or indirectly at least on one surface of a lens substrate. The multilayer film includes at least one high refractive index layer and at least one low refractive index layer, the total optical film thickness of the high refractive index layer is $\lambda/4$ or more at a wavelength $\lambda=780$ nm, and a reflection spectrum measured in a wavelength range of 380 to 2000 nm on a surface having the multilayer film has a maximum reflectance in a wavelength range of 800 to 1350 nm.

A spectacle lens according to a preferable aspect of the present invention includes a multilayer of a vapor deposition film (excluding a metal film and a metal alloy film) directly or indirectly at least on one surface of a plastic lens substrate. The multilayer film includes at least one high refractive index layer and at least one low refractive index layer, the total layer number of the high refractive index layer and the low refractive index layer is nine or less, the total optical film thickness of the high refractive index layer is $\lambda/4$ or more at a wavelength $\lambda=780$ nm, and a reflection spectrum measured in a wavelength range of 380 to 2000 nm on a surface having the multilayer film has a maximum reflectance in a wavelength range of 800 to 1350 nm.

Hereinafter, the spectacle lens will be described in more detail.

Lens Substrate

As the lens substrate, a lens substrate usually used for a spectacle lens, for example, a plastic lens substrate or a glass lens substrate can be used. Usually, the thickness of the lens substrate is about 1 to 30 mm, the diameter thereof is about 50 to 100 mm. However, the thickness and the diameter are not particularly limited.

Figure 1:
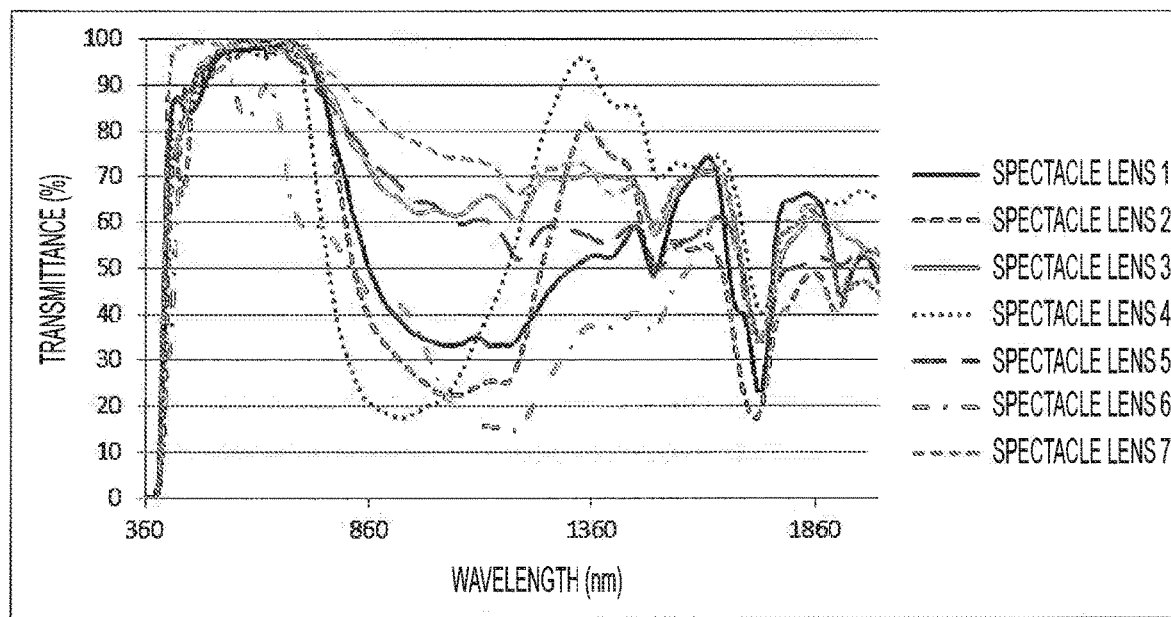
FIG. 1 illustrates transmission spectra of spectacle lenses 1 to 7 described below.

In general, a plastic lens substrate is lighter and more unlikely to be cracked than a glass lens substrate, and therefore has been used widely as a lens substrate for a spectacle lens in recent years. As the plastic lens substrate, a lens substrate made of plastic usually used for a spectacle lens substrate, such as an allyl resin, a urethane resin, a polysulfide resin, or a polycarbonate resin, can be used. The plastic lens substrate can contain an additive in order to impart a desired ability to a spectacle lens. As such an additive, a known additive can be used according to a desired ability. Examples thereof include an ultraviolet absorber. As the ultraviolet absorber, a known ultraviolet absorber can be used without any limitation. By providing a multilayer film described below on a plastic lens substrate containing an ultraviolet absorber, it is possible to obtain a spectacle lens capable of reducing the amount of an ultraviolet ray or a sunlight infrared ray incident on the eye, and furthermore, it is possible to obtain a spectacle lens capable of reducing the amount of an ultraviolet ray, the above blue light, or a sunlight infrared ray incident on the eye. Here, the ultraviolet ray means light in a wavelength range of a wavelength of 280 to 380 nm. The transmittance in solar ultraviolet spectrum is calculated according to 15.3.2 and 15.3.3 in JIS T 7330. As illustrated in FIG. 1, according to the aspect of the present invention, the transmittance can be 0% at a wavelength of 380 nm or less, and it is thereby possible to obtain a spectacle lens in which the transmittance in solar ultraviolet spectrum is less than 1%.

The plastic lens substrate is more easily deformed or melted as the time of exposure to a high temperature during vapor deposition is longer. On the other hand, in the spectacle lens according to the preferable aspect of the present invention, the total layer number of a high refractive index layer and a low refractive index layer constituting the multilayer film is as small as nine or less, and therefore deformation or melting of the plastic lens substrate due to vapor deposition can be avoided. Many high refractive index materials have high melting points, and therefore the vapor deposition temperature during formation of a high refractive index layer tends to be high. Therefore, the larger lamination number of a high refractive index layer causes deformation or melting of the plastic lens substrate more easily. On the other hand, the multilayer film included in the spectacle lens according to the aspect of the present invention includes a high refractive index layer and a low refractive index layer, and the high refractive index layer and the low refractive index layer are usually laminated alternately. The total lamination number of the high refractive index layer is preferably five or less. In this way, the small lamination number of the high refractive index layer is advantageous in order to prevent deformation or melting of the plastic lens substrate.

The above multilayer film may be formed directly on a lens substrate surface, or may be formed indirectly through one or more functional films. The functional film which can be present between the lens substrate and the multilayer film is not particularly limited. Examples thereof include a hard coat layer which is a functional film for contributing to improvement of durability and a primer layer for improving adhesion (adhesive layer). As these optionally formed functional films, a known functional film can be used without any limitation. The film thickness of the functional film is only required to be set in a range capable of exhibiting a desired function, and is not particularly limited. There are some commercially available lens substrates with hard coat layers in order to prevent generation of a scratch during storage or distribution. In the aspect of the present invention, such a lens substrate can be also used.

The spectacle lens according to the aspect of the present invention may include the multilayer film described in detail below only on one of an object-side surface and an eyeball-side surface or on both surfaces thereof. The multilayer film is preferably provided on both surfaces of the spectacle lens from a viewpoint of further reducing the amount of an infrared ray incident on the eye.

In the spectacle lens according to the aspect of the present invention, the reflection spectrum measured in the above wavelength range on a surface having the multilayer film has a maximum reflectance in a wavelength range of 800 to 1350 nm. As described above, the maximum reflectance is present in a wavelength range of light with a high intensity of infrared rays contained in sunlight, and it is thereby possible to effectively reduce burden of the eye due to an infrared ray in sunlight. In order to more effectively reduce burden of the eye due to an infrared ray contained in sunlight, the wavelength range in which the maximum reflectance is present preferably contains light with a higher intensity of infrared rays contained in sunlight. From this point, the maximum reflectance is present preferably in a wavelength range of 900 to 1200 nm, more preferably in a wavelength range of 1000 to 1100 nm.

The reflectance at the maximum reflectance is preferably 25% or more, more preferably 30% or more, still more preferably 35% or more, and further still more preferably 40% or more. The reflectance at the maximum reflectance, for example, of 70% or less, furthermore, of about 60% or less or 50% or less can reduce burden of the human eye sufficiently effectively.

Multilayer Film

In the spectacle lens according to the aspect of the present invention, the multilayer film provided directly or indirectly at least on one surface of a lens substrate is a laminated body of a vapor deposition film excluding a metal film and a metal alloy film. The vapor deposition film can be a vapor deposition film of an inorganic compound excluding a metal and a metal alloy, such as an inorganic oxide, an inorganic nitride, an inorganic fluoride, or a mixture of two or more kinds thereof, and may be a vapor deposition film of a vapor deposition material containing an inorganic compound and an organic compound. Details thereof will be described below. The vapor deposition film constituting the multilayer film does not contain a metal film or a metal alloy film.

Therefore, a high luminous transmittance required for the spectacle lens can be realized. The spectacle lens according to the aspect of the present invention can exhibit, for example, a luminous transmittance of 80% or more, or also of 90% or more. For example, the luminous transmittance is 99% or less. However, the higher the luminous transmittance is, the better, and the upper limit thereof is not particularly limited. Reduction in the total lamination number of a multilayer film can also contribute to further improvement of the luminous transmittance.

A multilayer film including a metallic thin film tends to cause coloring. This is mainly because the reflectance in a wavelength range of 600 to 780 nm is increased. On the other hand, the spectacle lens according to the aspect of the present invention does not include a metallic thin film in the multilayer film, and therefore can realize a low reflectance in the wavelength range of 600 to 780 nm. Specifically, in the wavelength range of 600 to 780 nm, the spectacle lens according to the aspect of the present invention can realize a mean reflectance of less than 10%, preferably 7% or less, more preferably 6% or less, for example, 3 to 6% or 4 to 6%. The spectacle lens according to the aspect of the present invention can exhibit a high transmittance in the wavelength range of 600 to 780 nm. Specifically, in the wavelength range of 600 to 780 nm, the spectacle lens according to the aspect of the present invention can exhibit a mean transmittance of preferably 75% or more, more preferably 80% or more, still more preferably 85% or more, for example, 85 to 99%. The high transmittance in the wavelength range of 600 to 780 nm is preferable because of being able to contribute to improvement of a luminous transmittance.

(High Refractive Index Layer)

The multilayer film includes at least one high refractive index layer. The total layer number of the high refractive index layer is preferably two or more, and may be three, four, five, or six or more. As described above, by setting the total optical film thickness of the high refractive index layer to $\lambda/4$ ($0.250\lambda$) ($\lambda=780$ nm) or more, a multilayer film capable of effectively reducing burden of the eye due to an infrared ray contained in sunlight can be obtained.

When two or more high refractive index layers are included, the film thickness of each layer is only required to be set appropriately based on a known optical design method. The total optical film thickness of the high refractive index layer is preferably $\lambda$ or less at a wavelength $\lambda=1350$ nm from a viewpoint of preventing deformation or melting of a plastic lens substrate more effectively while realizing a desired reflection characteristic.

As a high refractive index material constituting the high refractive index layer, it is possible to use various high refractive index materials known as a material constituting a high refractive index layer of a multilayer film generally used as an antireflection coating of a spectacle lens. Among the materials, a high refractive index material having a refractive index of 2.0 or more and less than 2.4 at a wavelength 780 nm can realize a desired reflection characteristic with a relatively thin film thickness. A thinner film thickness makes vapor deposition time shorter. Therefore, an influence of vapor deposition on a plastic lens substrate can be prevented more effectively. From the above points, preferable examples of the high refractive index material include niobium oxide (for example, $Nb_2O_5$), titanium oxide (for example, $TiO_2$), zirconium oxide (for example, $ZrO_2$), tantalum oxide (for example, $Ta_2O_5$) and a composite oxide formed of two or more kinds selected from the group consisting of these oxides.

When the multilayer film includes two or more high refractive index layers, these high refractive index layers may be formed of the same kind of inorganic compound or may be formed of different kinds of inorganic compounds. This point is similar in a low refractive index layer described below.

(Low Refractive Index Layer)

The low refractive index layer is only required to be a layer exhibiting a lower refractive index than the high refractive index layer. The low refractive index layer is a vapor deposition film made of a low refractive index material having a refractive index preferably of 1.2 or more and 1.8 or less, more preferably in a range of 1.233 to 1.746 at a wavelength 780 nm. Preferable examples of the low refractive index material include silicon oxide (for example, $SiO_2$), aluminum oxide (for example, $Al_2O_3$), magnesium fluoride (for example, $MgF_2$), calcium fluoride (for example, $CaF_2$), and aluminum fluoride (for example, $AlF_3$).

The layer number of the low refractive index layer included in the multilayer film is one or more, preferably two or more, more preferably three or more, and may be four, five, or six or more. The total optical film thickness of the low refractive index layer and the film thickness of each layer are only required to be adjusted appropriately so as to obtain a desired reflection characteristic, and are not particularly limited. The low refractive index material generally has a relatively low melting point. Therefore, it can be said that a possibility that the low refractive index material is exposed to such a high temperature that a plastic lens substrate is deformed or melted during film formation of the low refractive index layer is low or little.

In the spectacle lens according to the aspect of the present invention, the total layer number of a high refractive index layer and a low refractive index layer of the multilayer film is nine or less in the aspect, and is 10 or more in another aspect. Ten or more means, for example, about 10 to 15, but is not particularly limited.

In the multilayer film included in the spectacle lens according to the preferable aspect of the present invention, the total layer number of a high refractive index layer and a low refractive index layer is nine or less. This small lamination number is preferable from a viewpoint of preventing deformation or melting of a plastic lens substrate. The small total layer number of a high refractive index layer and a low refractive index layer is also preferable from a viewpoint of further improving a luminous transmittance. In the spectacle lens according to the preferable aspect of the present invention, the total layer number of a high refractive index layer and a low refractive index layer can be eight or less, or smaller. The total film thickness of the multilayer film is preferably thin, for example, 1400 nm or less as a physical film thickness from a viewpoint of preventing deformation or melting of a plastic lens substrate more effectively.

The high refractive index layer or the low refractive index layer described above can be formed by sequentially performing vapor deposition using a high refractive index material or a low refractive index material as a vapor deposition source. Vapor deposition can be performed by a vacuum vapor deposition method, an ion plating method, a plasma CVD method, an ion assist method, a reactive sputtering method, or the like. The ion assist method is preferable in order to obtain a high film hardness and excellent adhesion. As an assist gas (ionized gas) used in the ion assist method, oxygen, nitrogen, argon, or a mixed gas thereof is preferably used from a viewpoint of reactivity during film formation. In the spectacle lens of the present invention, the total number of a high refractive index layer and a low refractive index layer constituting the multilayer film is as small as nine or less. Therefore, exposure of a plastic lens substrate to a high temperature for a long time during vapor deposition due to longer film formation time can be avoided.

Spectral Characteristic of Spectacle Lens

In the spectacle lens according to the aspect of the present invention, the reflection spectrum measured on a surface having the multilayer film has a maximum reflectance in a wavelength range of 800 to 1350 nm. Meanwhile, as described above, an infrared ray contained in sunlight has a large peak in a relatively short wavelength range, and the intensity is reduced monotonously in a longer wavelength range than the peak wavelength. For example, the intensity of an infrared ray in a wavelength range of a wavelength 1800 nm or more is lower than that at the peak wavelength. Therefore, the reflectance in a wavelength range of a wavelength 1800 nm or more is not large, but it is possible to effectively reduce burden of the eye due to a sunlight infrared ray. From this point, in the spectacle lens according to the aspect of the present invention, the reflectance on a surface having the above multilayer film at a wavelength 1800 nm may be 30% or less. Furthermore, the reflectance in a long wavelength range of a wavelength 1800 nm or more may be 30% or less. The above reflectance is, for example, 2% or more, but the lower limit thereof is not particularly limited.

The reduction ratio in infrared spectrum calculated with the above calculation formula is preferably 25% or more, more preferably 30% or more, still more preferably 40% or more, and further still more preferably 50% or more. The higher reduction ratio in infrared spectrum is more preferable from a viewpoint of reduction in burden of the eye. However, as long as the reduction ratio in infrared spectrum is the above preferable lower limit value or more, even when the reduction ratio in infrared spectrum is 80% or less or 70% or less, it is possible to effectively reduce burden of the eye due to an infrared ray in sunlight in daily life.

As described above, the spectacle lens according to the aspect of the present invention preferably has a main wavelength in a range of 400 to 500 nm. The main wavelength in this range can reduce burden of the eye due to blue light in addition to a sunlight infrared ray. In order to impart an ability to reduce blue light to a spectacle lens, as described above, it is only required to adjust the film thickness of each layer constituting a multilayer film by a known optical design method. By the adjustment, in the spectacle lens according to the aspect of the present invention, a reduction ratio in blue light, for example, of 30% or more, for example, in a range of 30 to 50% can be realized. Here, the reduction ratio in blue light is calculated by the following formula in conformity with British Standard BS2724.

Reduction ratio in blue light (%)=100−{∫dλT(λ)}/∫dλ

(Here, λ means a range of 380 to 500 nm, and T(λ) means a transmittance spectrum of a lens.)

The spectacle lens according to the aspect of the present invention includes at least the above multilayer film on one surface or both surfaces thereof, but can include one or more functional films usually formed on a spectacle lens at any position in addition to the multilayer film. Such a functional film is not particularly limited. However, examples thereof include a known hard coat layer, a water-repellent layer, an antistatic layer, and a primer layer for improving adhesion between layers. The antistatic layer may be laminated on the multilayer film, or may be included in the multilayer film. For example, a high refractive index layer may act as the antistatic layer, and such an aspect is also included in the present invention as an aspect. A known treatment such as cleaning or drying can be performed before and after formation of each layer.

EXAMPLES

Hereinafter, the present invention will be further described with Examples, but the present invention is not limited to the aspects indicated by Examples.

[Spectacle Lens 1]

(1) Preparation of Plastic Lens Substrate with Hard Coat Layer

A urethane resin plastic lens substrate containing an ultraviolet absorber (glass transition temperature of urethane resin used Tg=90° C.) was subjected to ultrasonic cleaning with a neutral detergent, then was subjected to ultrasonic cleaning with each of an alcohol and pure water, and then was dried. A silica sol-containing hard coat layer was formed on both surfaces of the plastic lens base material after drying by a dipping method.

(2) Preparation of Spectacle Lens with Double-Sided Multilayer Film

On each surface of a plastic lens substrate (surfaces of the hard coat layer prepared in the above (1)), a multilayer film having seven layers of a low refractive index layer and a high refractive index layer in total laminated alternately was formed using vapor deposition materials shown in Table 1 under ion assist conditions shown in Table 2 by a vacuum vapor deposition method using an ion assist. The temperature of the plastic lens substrate during film formation was measured by performing a vapor deposition treatment by sticking a thermo seal to the plastic lens substrate.

In this way, the spectacle lens 1 having the multilayer films on both surfaces of the plastic lens substrate was obtained.

[Spectacle Lenses 2 to 7]

A spectacle lens was prepared in a similar manner to Example 1 except that a multilayer film having five to ten layers of a low refractive index layer and a high refractive index layer in total laminated alternately was formed using vapor deposition materials shown in Table 1 under ion assist conditions shown in Table 2 by a vacuum vapor deposition method using an ion assist.

TABLE 1

| | Spectacle lens 1 | | | | Spectacle lens 2 | | | |
|---|---|---|---|---|---|---|---|---|
| | Physical film thickness nm | Material | Refractive index (780 nm) | Optical film thickness (λ 780 nm) | Physical film thickness nm | Material | Refractive index (780 nm) | Optical film thickness (λ 780 nm) |
| First layer | 136 | SiO$_2$ | 1.47 | 0.26 λ | 134 | ZrO$_2$ | 2.06 | 0.35 λ |
| Second layer | 7 | Nb$_2$O$_5$ | 2.20 | 0.02 λ | 163 | SiO$_2$ | 1.47 | 0.31 λ |
| Third layer | 38 | SiO$_2$ | 1.47 | 0.07 λ | 114 | ZrO$_2$ | 2.06 | 0.30 λ |
| Fourth layer | 106 | Nb$_2$O$_5$ | 2.20 | 0.30 λ | 158 | SiO$_2$ | 1.47 | 0.30 λ |

TABLE 1-continued

|  | | | | | | | |
|---|---|---|---|---|---|---|---|
| Fifth layer | 179 | SiO$_2$ | 1.47 | 0.34 λ | 112 | ZrO$_2$ | 2.06 | 0.30 λ |
| Sixth layer | 88 | Nb$_2$O$_5$ | 2.20 | 0.25 λ | 186 | SiO$_2$ | 1.47 | 0.35 λ |
| Seventh layer | 86 | SiO$_2$ | 1.47 | 0.16 λ | 156 | ZrO$_2$ | 2.06 | 0.41 λ |
| Eighth layer | | | | | 100 | SiO$_2$ | 1.47 | 0.19 λ |
| Ninth layer | | | | | | | | |
| Tenth layer | | | | | | | | |
| Total optical film thickness of high refractive index layer | (λ 780 nm) 0.563 λ (λ 1350 nm) 0.325 λ | | | | (λ 780 nm) 1.364 λ (λ 1350 nm) 0.778 λ | | | |

|  | Spectacle lens 3 | | | | Spectacle lens 4 | | | |
|---|---|---|---|---|---|---|---|---|
|  | Physical film thickness nm | Material | Refractive index (780 nm) | Optical film thickness (λ 780 nm) | Physical film thickness nm | Material | Refractive index (780 nm) | Optical film thickness (λ 780 nm) |
| First layer | 39 | SiO$_2$ | 1.47 | 0.07 λ | 39 | SiO$_2$ | 1.47 | 0.07 λ |
| Second layer | 14 | ZrO$_2$ | 2.06 | 0.04 λ | 14 | ZrO$_2$ | 2.06 | 0.04 λ |
| Third layer | 239 | SiO$_2$ | 1.47 | 0.45 λ | 239 | SiO$_2$ | 1.47 | 0.45 λ |
| Fourth layer | 21 | ZrO$_2$ | 2.06 | 0.05 λ | 21 | ZrO$_2$ | 2.06 | 0.05 λ |
| Fifth layer | 215 | SiO$_2$ | 1.47 | 0.41 λ | 215 | SiO$_2$ | 1.47 | 0.41 λ |
| Sixth layer | 111 | ZrO$_2$ | 2.06 | 0.29 λ | 111 | ZrO$_2$ | 2.06 | 0.29 λ |
| Seventh layer | 94 | SiO$_2$ | 1.47 | 0.18 λ | 94 | SiO$_2$ | 1.47 | 0.18 λ |
| Eighth layer | | | | | 111 | ZrO$_2$ | 2.06 | 0.29 λ |
| Ninth layer | | | | | 94 | SiO$_2$ | 1.47 | 0.18 λ |
| Tenth layer | | | | | | | | |
| Total optical film thickness of high refractive index layer | (λ 780 nm) 0.385 λ (λ 1350 nm) 0.220 λ | | | | (λ 780 nm) 0.677 λ (λ 1350 nm) 0.387 λ | | | |

|  | Spectacle lens 5 | | | | Spectacle lens 6 | | | |
|---|---|---|---|---|---|---|---|---|
|  | Physical film thickness nm | Material | Refractive index (780 nm) | Optical film thickness (λ 780 nm) | Physical film thickness nm | Material | Refractive index (780 nm) | Optical film thickness (λ 780 nm) |
| First layer | 134 | SiO$_2$ | 1.47 | 0.25 λ | 128 | ZrO$_2$ | 2.06 | 0.34 λ |
| Second layer | 163 | Nb$_2$O$_5$ | 2.20 | 0.46 λ | 128 | SiO$_2$ | 1.47 | 0.24 λ |
| Third layer | 114 | SiO$_2$ | 1.47 | 0.21 λ | 110 | ZrO$_2$ | 2.06 | 0.29 λ |
| Fourth layer | 158 | Nb$_2$O$_5$ | 2.20 | 0.44 λ | 141 | SiO$_2$ | 1.47 | 0.27 λ |
| Fifth layer | 112 | SiO$_2$ | 1.47 | 0.21 λ | 98 | ZrO$_2$ | 2.06 | 0.26 λ |
| Sixth layer | | | | | 180 | SiO$_2$ | 1.47 | 0.34 λ |
| Seventh layer | | | | | 165 | ZrO$_2$ | 2.06 | 0.44 λ |
| Eighth layer | | | | | 207 | SiO$_2$ | 1.47 | 0.39 λ |
| Ninth layer | | | | | 152 | ZrO$_2$ | 2.06 | 0.40 λ |
| Tenth layer | | | | | 95 | SiO$_2$ | 1.47 | 0.18 λ |
| Total optical film thickness of high refractive index layer | (λ 780 nm) 0.903 λ (λ 1350 nm) 0.521 λ | | | | (λ 780 nm) 1.728 λ (λ 1350 nm) 0.985 λ | | | |

|  | Spectacle lens 7 | | | |
|---|---|---|---|---|
|  | Physical film thickness nm | Material | Refractive index (780 nm) | Optical film thickness (λ 780 nm) |
| First layer | 23 | SiO$_2$ | 1.47 | 0.04 λ |
| Second layer | 5 | ZrO$_2$ | 2.06 | 0.01 λ |
| Third layer | 203 | SiO$_2$ | 1.47 | 0.38 λ |
| Fourth layer | 31 | ZrO$_2$ | 2.06 | 0.08 λ |
| Fifth layer | 22 | SiO$_2$ | 1.47 | 0.04 λ |
| Sixth layer | 58 | ZrO$_2$ | 2.06 | 0.15 λ |
| Seventh layer | 90 | SiO$_2$ | 1.47 | 0.17 λ |
| Eighth layer | | | | |
| Ninth layer | | | | |
| Tenth layer | | | | |

TABLE 1-continued

| | | |
|---|---|---|
| Total optical film thickness of high refractive index layer | (λ 780 nm) | 0.248 λ |
| | (λ 1350 nm) | 0.174 λ |

TABLE 2

| | Spectacle lens 1 | Spectacle lens 2 | Spectacle lens 3 | Spectacle lens 4 | Spectacle lens 5 | Spectacle lens 6 | Spectacle lens 7 |
|---|---|---|---|---|---|---|---|
| Low refractive index layer | $SiO_2$ | $SiO_2$ | $SiO_2$ | $SiO_2$ | $SiO_2$ | $SiO_2$ | $SiO_2$ |
| Film formation rate (Å/s) | 15 | 15 | 15 | 15 | 15 | 15 | 15 |
| Ion gun gas | $O_2$/Ar | $O_2$/Ar | O2/Ar | O2/Ar | O2/Ar | $O_2$/Ar | $O_2$/Ar |
| Flow rate (sccm) | 10/10 | 10/10 | 10/10 | 10/10 | 10/10 | 10/10 | 10/10 |
| High refractive index layer | $Nb_2O_5$ | $ZrO_2$ | $ZrO_2$ | $ZrO_2$ | $Nb_2O_5$ | $ZrO_2$ | $ZrO_2$ |
| Film formation rate (Å/s) | 2.5 | 3.5 | 3.5 | 3.5 | 2.5 | 2.6 | 2.6 |
| Ion gun gas | $O_2$/Ar | $O_2$/Ar | O2/Ar | O2/Ar | O2/Ar | $O_2$/Ar | $O_2$/Ar |
| Flow rate (sccm) | 10/10 | 10/10 | 10/10 | 10/10 | 10/10 | 10/10 | 10/10 |

Evaluation method (1) Evaluation of reflection characteristic

A reflection spectrum on a convex surface (object-side surface) of each of the spectacle lenses 1 to 7 was obtained using a Hitachi spectrophotometer U-4100. In order to remove an influence by concave surface reflection, the reflectance was measured by painting a concave surface black. A wavelength at which the maximum reflectance in a wavelength range of 380 to 2000 nm on the convex surface of each spectacle lens was obtained was determined using the obtained reflection spectrum. In this evaluation, the reflection spectrum was obtained on the convex surface. However, a multilayer film was formed also on the concave surface under the same film formation conditions, and therefore a similar reflection spectrum may be obtained even when measurement is performed on the concave surface. (2) Evaluation of transmittance characteristic A transmission spectrum of each of the spectacle lens 1 to 7 was measured using the above spectrophotometer. The obtained transmission spectrum is illustrated in FIG. 1. A mean transmittance in a wavelength range of 600 to 780 nm was determined for each spectacle lens using the measurement result of the transmission spectrum. The reduction ratio in solar infrared spectrum was calculated with the above formula using the obtained spectrum. The reduction ratio in blue light was calculated by the above formula in conformity with JIS T 7330 using the obtained spectrum. (3) Calculation of main wavelength Main wavelengths of the spectacle lenses 1 to 7 were determined in conformity with JIS Z 8105. (4) Measurement of substrate temperature The maximum temperature of a plastic lens substrate during formation of a multilayer film was measured with a thermo seal. (5) Evaluation of presence of film formation crack The spectacle lenses 1 to 7 were observed visually, and presence of a crack in the substrate after formation of a multilayer film was evaluated.

Figure 2:
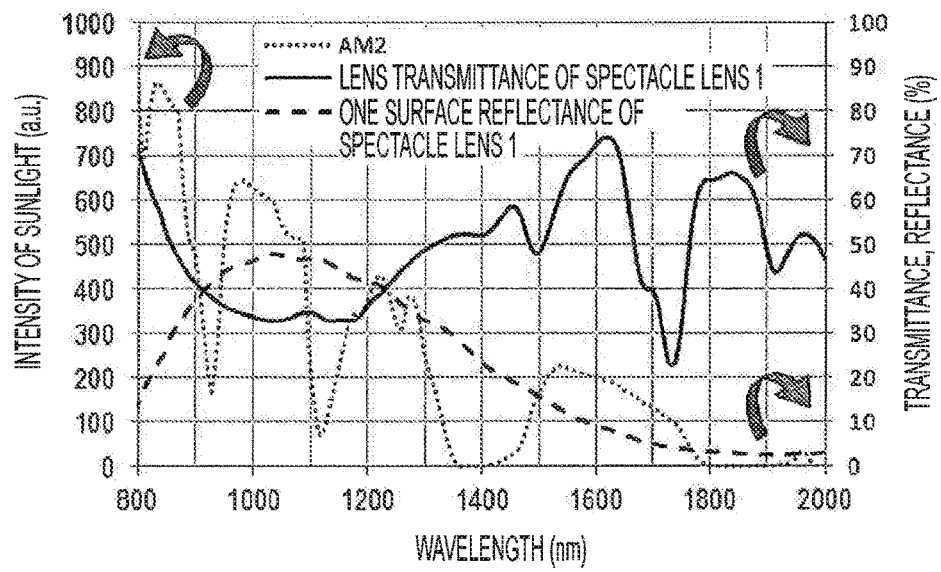
FIG. 2 illustrates a reflection spectrum and a transmission spectrum for the spectacle lens 1, and a sunlight infrared spectrum (AM2).

The above results are shown in Table 3. FIG. 2 illustrates a reflection spectrum and a transmission spectrum measured for the spectacle lens 1, and a sunlight infrared spectrum (AM2).

TABLE 3

| | Spectacle lens 1 | Spectacle lens 2 | Spectacle lens 3 | Spectacle lens 4 | Spectacle lens 5 | Spectacle lens 6 | Spectacle lens 7 |
|---|---|---|---|---|---|---|---|
| Reduction ratio in solar infrared spectrum (%) | 53.0 | 55.7 | 33.5 | 58.9 | 36.4 | 67.0 | 24.0 |
| Reduction ratio in blue light (%) | 31.2 | 39.3 | 28.7 | 30.5 | 28.5 | 41.2 | 18.7 |
| Luminous transmittance (%) | 96.5 | 96.1 | 97.8 | 96.8 | 98.6 | 89.0 | 99.1 |
| Mean transmittance at 600 to 780 nm (%) | 95.1 | 94.9 | 95.4 | 85.6 | 94.4 | 70.6 | 95.3 |
| Main wavelength (nm) | 471 | 454 | 462 | 453 | 471 | 451 | 555 |
| Wavelength at which the maximum reflectance is obtained (nm) | 1040 | 1060 | 1048 | 928 | 1200 | 1077 | 1277 |
| Substrate temperature | 85-90° C. | 85-90° C. | 85-90° C. | 85-90° C. | 85-90° C. | Higher than 90° C. to 95° C. | 80-85° C. |
| Film formation crack | Absent | Absent | Absent | Absent | Absent | Present | Absent |

Evaluation Result

By the result shown in Table 3, it can be confirmed that each of the spectacle lenses 1 to 6 has a high luminous transmittance, a high reduction ratio in solar infrared spectrum, and a high reduction ratio in blue light.

In each of the spectacle lenses 1 to 5, the total lamination number of a multilayer film is as small as nine or less. Therefore, the substrate temperature during film formation could be prevented from becoming high, and as a result, generation of a crack in the plastic lens substrate could be prevented. As shown in Table 3, each of the spectacle lenses 1 to 5 has a high mean transmittance and a high luminous transmittance in a wavelength range of 600 to 780 nm. Such a spectacle lens is preferable also in terms of less coloring because the mean reflectance in a wavelength range of 600 to 780 nm is less than 10%.

The spectacle lens 6 has a higher reduction ratio in solar infrared spectrum because the lamination number of the multilayer film is 10, larger than those of the spectacle lenses 1 to 5. However, the transmittance in a range of 600 to 780 nm was reduced due to the large lamination number (red reflection occurred), and the luminous transmittance was reduced with this.

Meanwhile, the multilayer film of the spectacle lens 7 has a structure of a multilayer film conventionally used as an antireflection coating. As shown in Table 3, the multilayer film of the spectacle lens 7 has a low reduction ratio in solar infrared spectrum, and cannot effectively reduce burden of the eye due to an infrared ray contained in sunlight.

The above results have verified that the aspect of the present invention can provide a spectacle lens capable of exhibiting a high reduction ratio in solar infrared spectrum and further capable of effectively reducing burden of the eye due to blue light.

INDUSTRIAL APPLICABILITY

The present invention is useful in an field of manufacturing a spectacle lens.

The invention claimed is:

1. A spectacle lens comprising a multilayer film of a vapor deposition film directly or indirectly at least on one surface of a lens substrate, wherein:
   the multilayer film includes at least one high refractive index layer and at least one low refractive index layer;
   a high refractive index material constituting the high refractive index layer is selected from the group consisting of niobium oxide and zirconium oxide;
   a total optical film thickness of the high refractive index layer is $0.563\lambda$ or more at a wavelength $\lambda=780$ nm;
   a total layer number of the high refractive index layer and the low refractive index layer in the multilayer film is nine or less, to increase a luminous transmittance of the multilayer film;
   the luminous transmittance is 90% or more;
   a mean transmittance in a wavelength range of 600 to 780 nm is 80% or more;
   a reflection spectrum measured in a wavelength range of 380 to 2000 nm on a surface having the multilayer film has a maximum reflectance in a wavelength range of 800 to 1350 nm; and
   a dominant wavelength of the spectacle lens is in a wavelength range of 400 to 500 nm.

2. The spectacle lens according to claim 1, wherein the lens substrate is a plastic lens substrate.

3. The spectacle lens according to claim 1, wherein a reduction ratio in solar infrared spectrum is 25% or more.

4. The spectacle lens according to claim 1, wherein a reflectance on the surface having the multilayer film is 30% or less at a wavelength 1800 nm.

5. The spectacle lens according to claim 1, wherein a mean reflectance on the surface having the multilayer film is less than 10% in a wavelength range of 600 to 780 nm.

6. The spectacle lens according to claim 1, comprising the multilayer film deposited directly or indirectly on both surfaces of the lens substrate.

7. The spectacle lens according to claim 1, wherein the high refractive index layer is a vapor deposition film made of the high refractive index material having a refractive index of 2.0 or more and less than 2.4 at a wavelength 780 nm.

8. The spectacle lens according to claim 1, wherein the low refractive index layer is a vapor deposition film made of a low refractive index material having a refractive index of 1.2 or more and 1.8 or less at a wavelength 780 nm.

\* \* \* \* \*